US005362005A

United States Patent [19]

Santandrea

[11] Patent Number: 5,362,005
[45] Date of Patent: * Nov. 8, 1994

[54] METHODS AND APPARATUS FOR AUTOMATED STATOR WINDING STATION SET UP

[75] Inventor: Luciano Santandrea, Florence, Italy

[73] Assignee: Axis U.S.A., Inc., Marlborough, Mass.

[ * ] Notice: The portion of the term of this patent subsequent to May 4, 2010 has been disclaimed.

[21] Appl. No.: 11,517

[22] Filed: Feb. 1, 1993

Related U.S. Application Data

[63] Continuation of Ser. No. 592,221, Oct. 3, 1990, Pat. No. 5,207,745, which is a continuation-in-part of Ser. No. 306,618, Feb. 6, 1989, Pat. No. 4,969,606.

[51] Int. Cl.$^5$ .............................................. H02K 15/02
[52] U.S. Cl. ............................................... 242/1.10 R
[58] Field of Search ................... 242/1.1 R, 7.02, 7.03, 242/1.1 A; 29/596

[56] References Cited

U.S. PATENT DOCUMENTS

| | | | |
|---|---|---|---|
| 3,414,204 | 12/1968 | Friedrich | 242/1.1 R |
| 3,901,454 | 8/1975 | Reiger | 242/1.1 R |
| 4,713,883 | 12/1987 | Santandrea | 242/1.1 R |
| 4,946,111 | 8/1990 | Luciani | 242/1.1 R |
| 4,969,606 | 11/1990 | Santandrea | 242/1.1 R |
| 4,982,909 | 1/1991 | Luciani | 242/1.1 R |
| 4,991,782 | 2/1991 | Luciani | 242/1.1 R |
| 5,149,000 | 9/1992 | Santandrea | 242/1.1 R |
| 5,207,745 | 5/1993 | Santandrea | 242/1.1 R |

FOREIGN PATENT DOCUMENTS 0478302 4/1992 European Pat. Off. .

*Primary Examiner*—Katherine Matecki
*Attorney, Agent, or Firm*—Nicola A. Pisano

[57] ABSTRACT

Methods and apparatus are provided for automatically adapting a stator winding station to wind stator cores of different lengths, without changing the lengths of the winding needles installed in the winding machine, and with minimum operator intervention. The method includes the step of translating the stator core, depending upon its length, to maintain the midpoint of the stator core at a fixed distance from a suitable reference frame, for example, the winding machine. Apparatus comprising first and second precision movement locators are described, wherein the first locator carries a stator housing, and the second locator carries lead termination equipment. The apparatus is adjusted automatically to position the stator core in a predetermined relation to the stator winding station, based on the length of the stator core to be wound.

14 Claims, 6 Drawing Sheets

METHODS AND APPARATUS FOR AUTOMATED STATOR WINDING STATION SET UP

This is a continuation, of application Ser. No. 07/592,221, filed Oct. 3, 1990 now U.S. Pat. No. 5,207,745 in the name of Luciano Santandrea and entitled Method and Apparatus For Automated Stator Winding Station Set Up, which is a continuation-in-part of U.S. patent application Ser. No. 07/306,618, filed Feb. 6, 1989, now U.S. Pat. No. 4,969,606.

BACKGROUND OF THE INVENTION

The present invention relates to the field of winding stator cores, such as those employed in electric motors, using winding shuttles having a reciprocatory and oscillatory motion. In particular, the present invention relates to methods and apparatus for a winding station stator core positioning system whereby stator cores of different lengths may be wound by a winding shuttle without replacing the winding needles or other time-consuming adjustments.

Modern stator winding equipment typically includes a pair of outwardly opposed needles disposed at one end of a shuttle, through which needles coil wire is laid in turns upon the poles of a stator core. The stator core is positioned with its longitudinal axis aligned with that of the winding shuttle output shaft. The shuttle is capable of reciprocatory motion along the longitudinal axis of the stator core, whereby the needles traverse a path parallel to the longitudinal axis of the stator core, in a manner per se known. Such a winding machine is described in Luciani et al. U.S. Pat. No. 4,858,835.

In presently existing machines, the stator core is positioned adjacent to the winding station with its proximal edge (i.e., that nearest the winding station) at a fixed distance, which fixed distance is independent of the stator length. When it is desired to wind a stator core of a different length, it is necessary to adjust the longitudinal stroke of the winding shuttle. Adjusting the stroke length in presently existing machines requires the operator either to change the winding needles for those of a suitable length or manually to adjust the needles to proper length, where the needles include a mechanism for varying their length. The needle replacement task requires removing the needles from the shuttle, selecting needles of the appropriate length for the stator core to be wound, rethreading the coil wire through the newly installed needles and verifying that the correct coil wire tensioning has been achieved. Such needle replacement or adjustment operations are both time consuming and require manual operator intervention, thereby reducing the overall productivity of the winding station.

Lead termination equipment located at the stator winding station, such as that described in commonly assigned copending U.S. application Ser. No. 07/321,919, filed Mar. 13, 1989, may be used to anchor the lead wires extending from the stator coils to the stator terminal board or pallet. In presently known winding station configurations, this equipment is typically located at a fixed distance from the proximal face of the stator core. While it is not generally necessary to reposition this equipment when winding stator cores of different lengths, such capability may be desirable when changing lead anchoring conditions or when a different type of stator terminal board is used.

In view of the foregoing, it is an object of the present invention to provide methods and apparatus for automatically adapting a stator winding station to wind stators of different lengths with a minimum of operator intervention.

It is a further object of this invention to provide methods and apparatus for automatically adapting a stator winding station for winding stator cores of different lengths without changing or adjusting the needles installed in the winder.

It is a further object of this invention to provide methods and apparatus for improving the overall productivity and cost-effectiveness of a stator core winding station by minimizing the down time associated with adjusting the winder for stator cores of different lengths.

It is yet another object of this invention to provide methods and apparatus for automatically repositioning lead termination equipment, used with a stator core winding station capable of automatic set-up, for different length stator cores.

SUMMARY OF THE INVENTION

These and other objects of the invention are accomplished in accordance with the principles of this invention by automatically adapting the stator winding station to wind stator cores of different lengths, without changing or adjusting the lengths of the needles installed in the winding shuttle, and with a minimum of operator intervention.

The present invention is described with reference to the automated stator core assembly line of commonly assigned copending U.S. application Ser. No. 07/306,618, now U.S. Pat. No. 4,969,606 although it is to be understood that the invention could be practiced on presently known winding stations. The method of the present invention includes the steps of translating the stator core, depending upon its length, to maintain the midpoint of the stator core length at a fixed distance from the winding machine. The apparatus of the present invention comprises first and second locator devices capable of precision movement, wherein the first locator carries a stator housing, and the second locator carries lead termination equipment. The apparatus is intended to adapt automatically to stator cores of different lengths without adjusting or replacing the winding needles mounted in the winder shuttle.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1A:
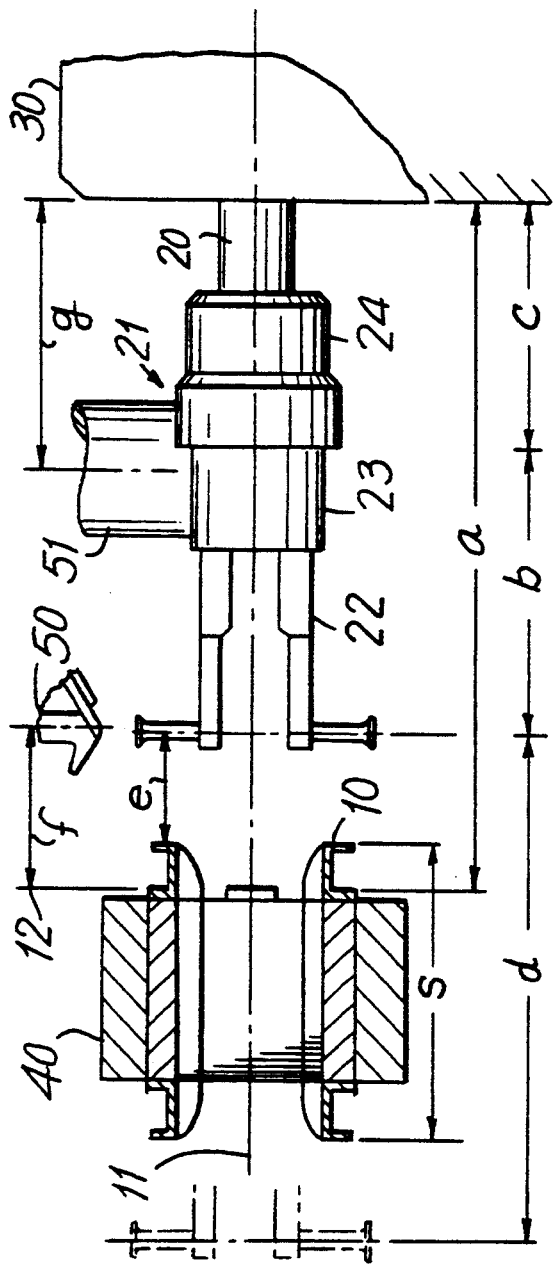
FIGS. 1A and 1B illustrate presently known methods by which a stator coil winding station is adapted to wind stator cores of different lengths.
Figure 1B:
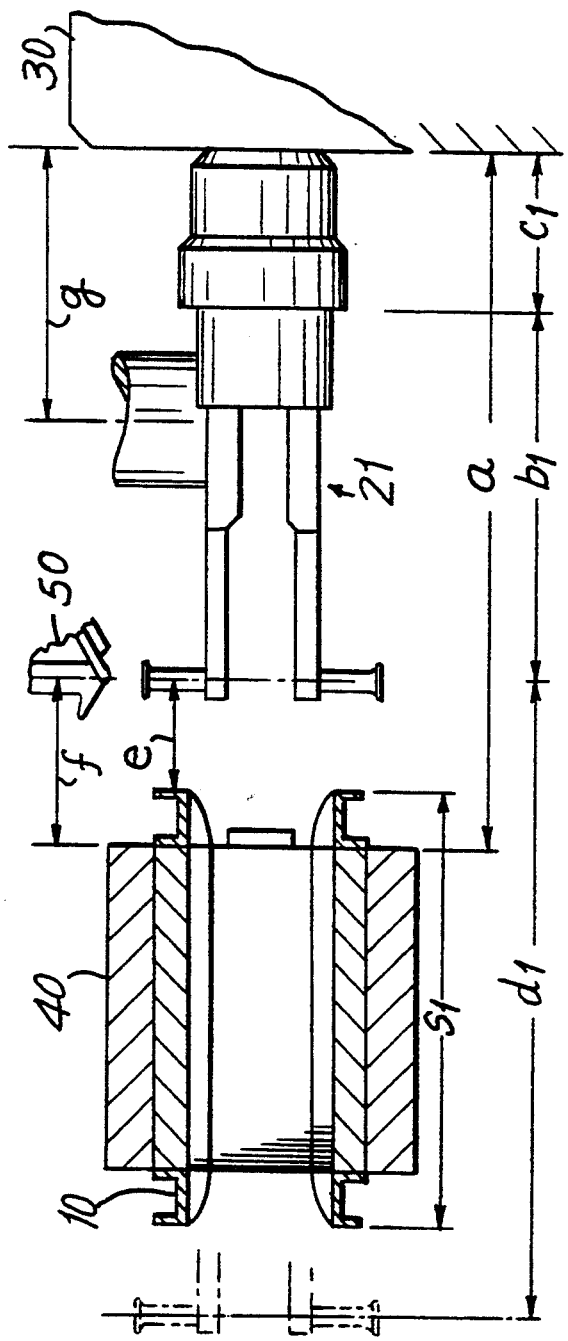

FIGS. 1A and 1B illustrate the methods by which a conventional stator coil winding apparatus is reconfigured to wind stator cores of different lengths. Stator 10 is positioned with its longitudinal axis 11 aligned with output shaft 20 of winding machine 30. Stator 10 is disposed in stator housing 40 so that reciprocatory movement by output shaft 20 translates needle assembly 21 along the longitudinal axis 11 of stator 10. Needle assembly 21 is comprised of needles 22, casing 23 and flange connection 24, which assembly is per se known. When needles 22 are adjacent and exterior to the stator endfaces, needle assembly 21 is rotated about its longitudinal axis to loop the coil wires extending therefrom onto the upper and lower poles of the stator core, as is also well known to those skilled in the art.

In a conventional winding station, the distance "a" between stator endface 12 nearest needle assembly 21 and a fixed reference frame, here winder 30, remains constant, regardless of stator core length "s." Comparing FIGS. 1A and 1B, it is seen that in such arrangements, any additional length of the stator core is accommodated towards the left in FIG. 1B. Needle assembly 21 has predetermined length "b," comprising the length between the wire guide tips of needles 22 and the face of flange connection 24 closest to stator core 10.

Length "c" shown in FIGS. 1A and 1B corresponds to the distance between the face of flange 24 nearest the stator core and a fixed reference frame, for example winder 30, for predetermined needle stroke adjustment "d." Stroke length "d" is that necessary for needle assembly 21 to wind a given stator core of length "s." For a stator core of length "s" and predetermined stroke length "d," the distance "c" represents the end of the winder longitudinal stroke nearest the winder 30, while the wire guide tips of needle assembly 21 will extend to the position shown in phantom lines on the outward stroke of output shaft 20.

Again comparing FIGS. 1A and 1B, it is seen that when a stator of different length "$s_1$" is positioned at distance "a" from the fixed reference frame, needle assembly stroke length "$d_1$" is required. Consequently, the position of flange connection 24 on the inward stroke of output shaft 20 changes to "$c_1$" and the outermost position achieved by the wire guide tips of needle assembly 21 also varies, as shown in FIG. 1B.

From the foregoing, it is apparent that the longitudinal stroke of needle assembly 21 must be adjusted to achieve a constant distance "e" from the end of the stator coil support to the wire guide tips of needles 22, which distance is determined by the type of coil support that is applied to the stator stack. For a conventional winding machine, the stroke of output shaft 20 can be altered by keying a new stroke length into the winder numerical controls. However, a different stroke length "$d_1$", as shown in FIG 1B, can be achieved only by replacing the original needles 22 with needles of suitable length "$b_1$." Alternatively, a mechanism could be developed which permits length "b" of needles 22 to be varied. However, both of these solutions would require the winding station operator to idle the winder for a considerable period while the proper length needles are selected and installed, or the needle lengths adjusted, precluding automatic set up of the winding station to accommodate stator cores of different lengths.

It is often desirable to employ stator coil lead termination equipment at the winding station to anchor the coil leads to the stator terminal board or housing 40, such as that described in commonly assigned copending U.S. application Ser. No. 07/321,919, filed Mar. 13, 1989. The hook portion of lead termination equipment 50 and lead termination equipment support column 51 are shown in FIGS. 1A and 1B, respectively, at distance "f" from plane 12 of stator core 10, and distance "g" from the fixed reference frame. In a conventional winding station, it generally would not be necessary to reposition lead termination equipment 50 or support column 51 for stator cores of different lengths, since distances "f" and "g" would not vary. However, the capability to change these distances may be desirable when changing lead anchoring conditions or when a different type of stator terminal board is mounted on the stator core.

Figure 2A:
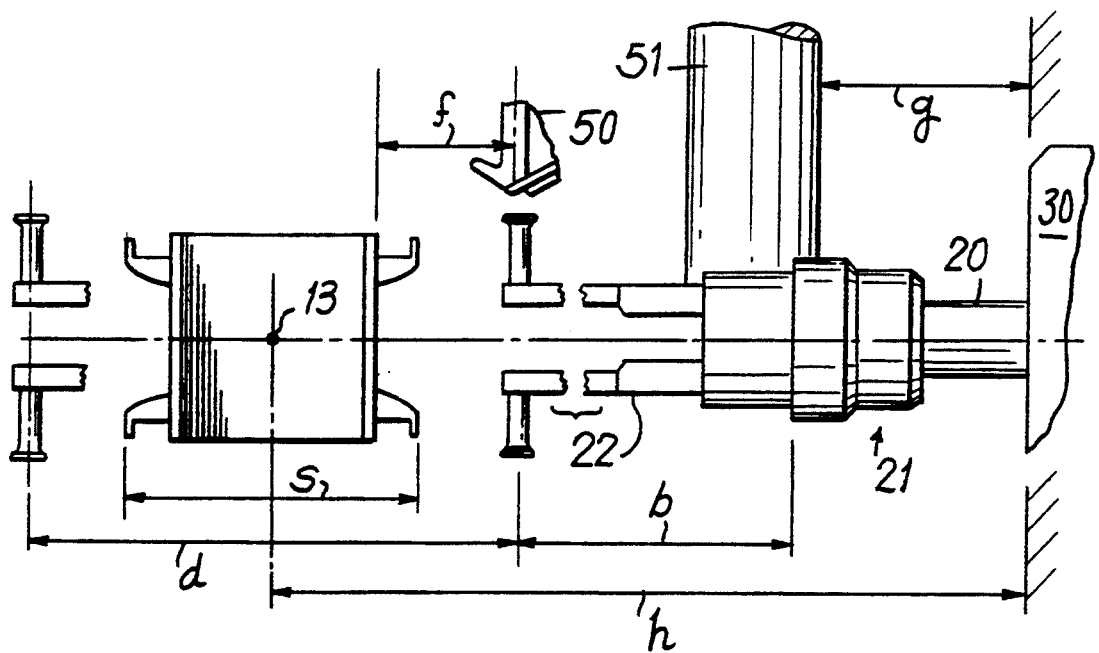
FIGS. 2A and 2B illustrate the methods by which a coil winding station may be configured to automatically adapt to stator cores of different lengths.
Figure 2B:
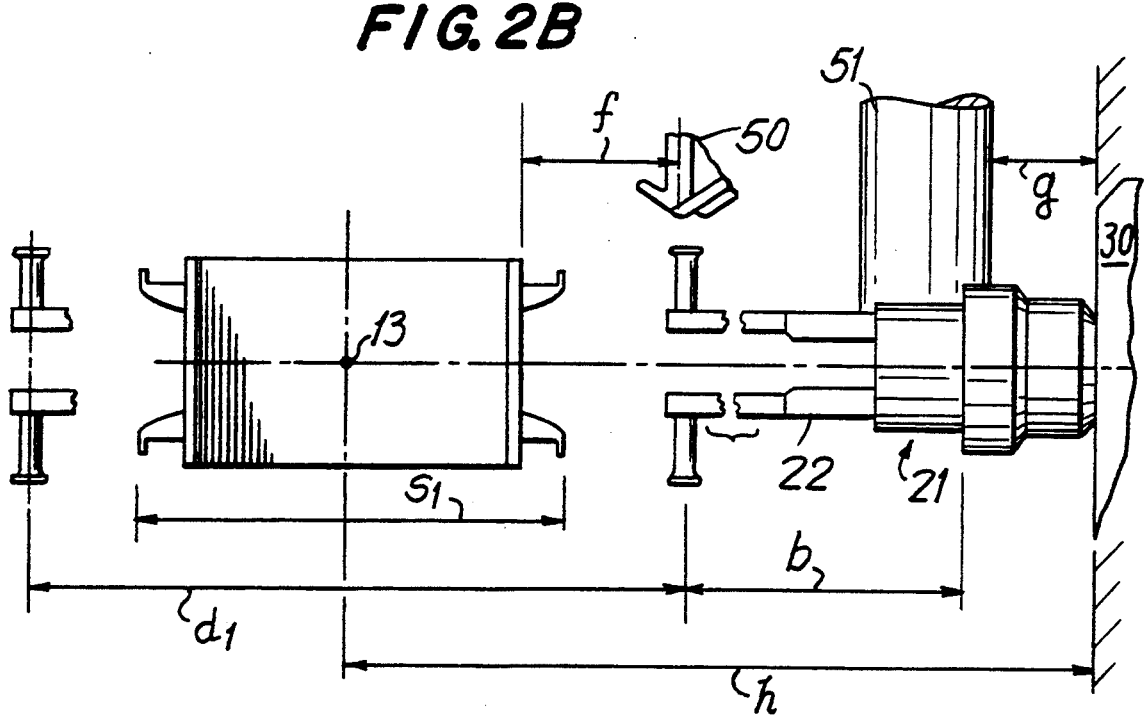

Referring now to FIGS. 2A and 2B, the method of the present invention is described. In accordance with the principles of this invention, midpoint 13 of longitudinal axis 11 of stator core 10 is positioned at fixed distance "h" from the fixed reference frame, independent of the stator core length "s" or "$s_1$." Point 13 represents the midpoint of all possible needle assembly stroke lengths "d" for a given needle length "b," making it possible to use the same needles 22 for different length stator cores. The method of the present invention therefore obviates the need to replace or adjust the length of needles 22. It is of course understood that in order to practice the present invention, needles 22 having a length suitable for winding the largest stator core to be wound must be installed in winder 30.

In view of the foregoing method for accomplishing the winding of different length stator cores using needles 22 of a single constant length, it is a further part of the method of the present invention to automatically obtain the desired spacing "f" between lead termination equipment 50 and endface 12 of stator core 10. This is achieved by adjusting distance "g" between lead termination equipment support column 51 and the fixed reference frame using an apparatus hereinafter described.

Figure 3:
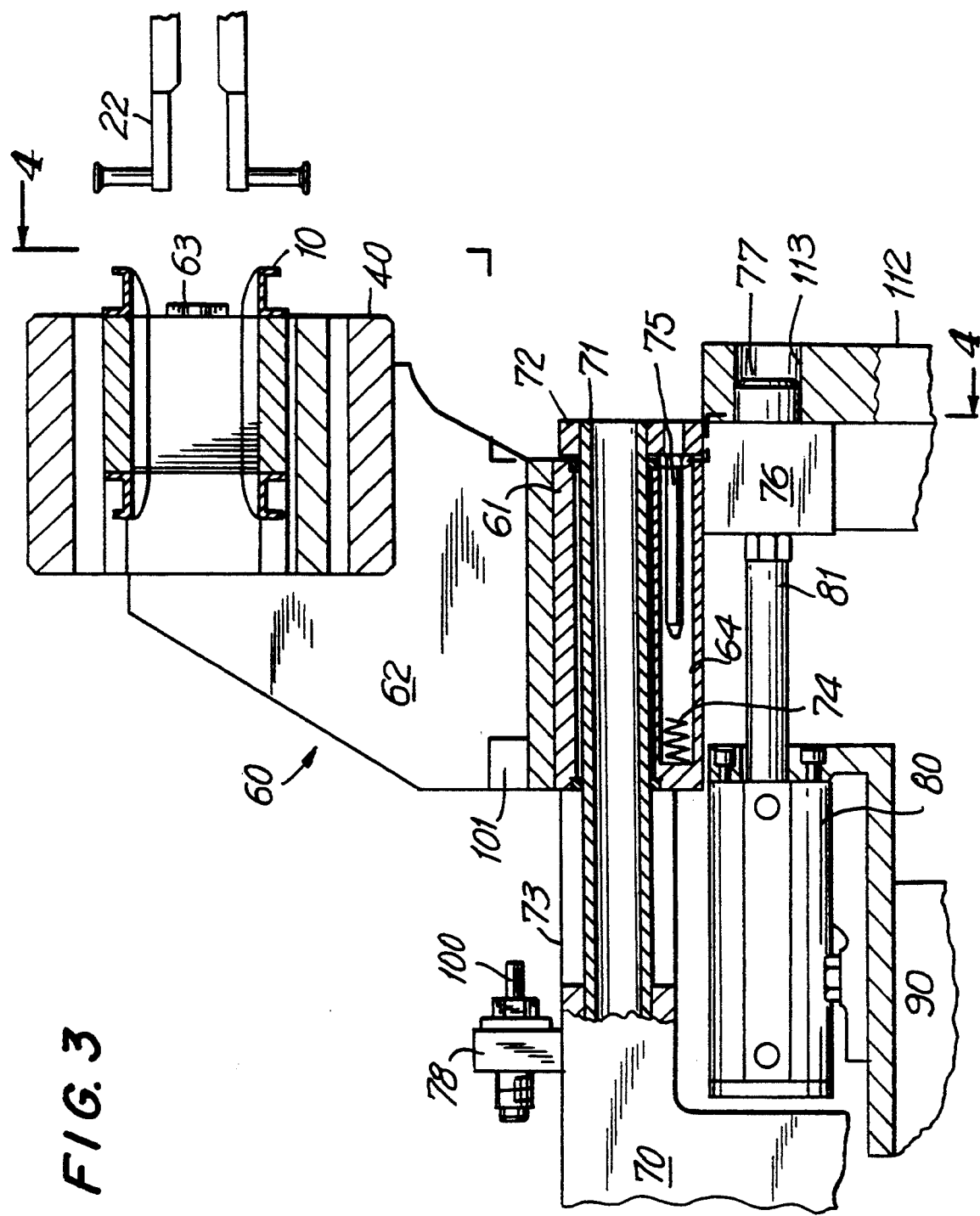
FIG. 3 is a cross-sectional elevation view of a stator locator constructed in accordance with the principles of the present invention.
Figure 4:
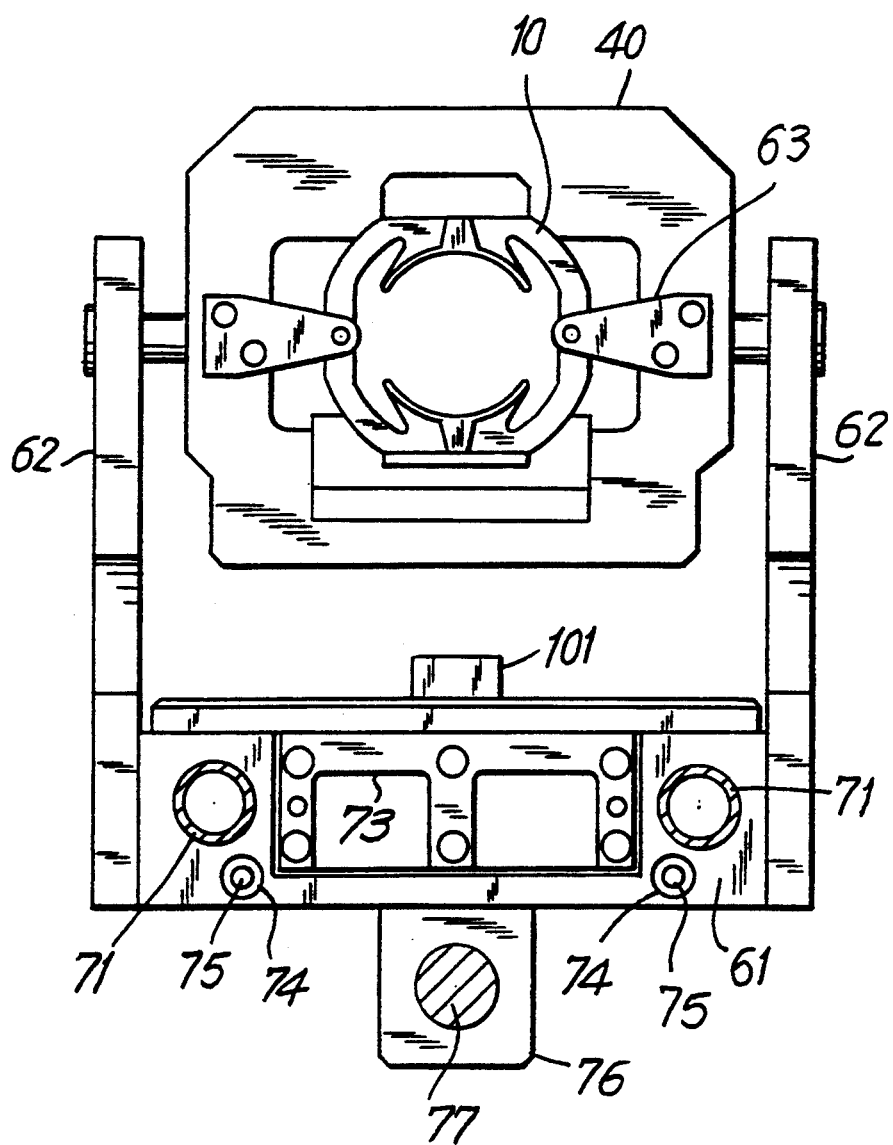
FIG. 4 is a front elevation view of the mechanism of FIG. 3 taken along the line 4—4.

FIGS. 3 and 4 show stator locator 60, for positioning stator core 10 relative to winder 30 in accordance with the foregoing principles. Stator locator 60 is mounted atop support frame 70, such as the turret assembly described in commonly assigned copending U.S. application Ser. No. 07/306,618, now U.S. Pat. No. 4,969,606. Stator locator 60 comprises slide block 61 slidably disposed on guide bars 71. A pair of vertically disposed stator housing support members 62 are fixed to the lateral edges of slide block 61. Guide bars 71 are fixed at one end to support frame 70, and at the other end to stop block 72. Support arm 73 is disposed between guide bars 71, and is fixed at one end to support frame 70 and at the other end to stop block 72. Stator housing 40, such as that described in U.S. application Ser. No. 07/306,618, is rotatably disposed between housing support members 62 for holding stator core 10. Stator housing 40 has two plates 63 which define a reference plane for endface 12 of stator core 10 nearest winder 30.

Slide block 61 has two blind bores 64 containing springs 74. Springs 74 are fixed at one end to the blind end of bores 64, while the free ends are disposed around guide pins 75 projecting into bores 64 from stop block 72. Guide pins 75 are intended to guide the coils of springs 74 when the springs are compressed.

Pneumatic cylinder 80 is mounted to winder support plate 90 so that its piston 81 abuts against push block 76. Push block 76 depends from the lower surface of slide block 61 and transmits the translation of piston 81 of cylinder 80 to stator housing 40. Push block 76 has knob 77 projecting from its front surface, which knob is intended to increase the rigidity of stator locator 60 when it is engaged in an adjustably locatable bore in the lead termination locator 110 described hereinafter.

Shock absorber 100 is mounted in mounting block 78 disposed from support frame 70 at a centrally located position behind slide block 61. Shock absorber 100 cooperates with stop block 101, which is fixedly connected to the upper surface of slide block 61, to arrest the rearward movement of slide block 61 which occurs when the pressure is released from pneumatic cylinder 80.

In operation, stator core 10 is placed in stator housing 40 so that its end nearest winder 30 abuts against stop plates 63. This reference plane remains the same for all stator cores which are positioned in stator housing 40, independent of the stator core length. Any variation in length of stator core 10 is accommodated by the additional space provided for this purpose at the left of stator housing 40, as seen in FIG. 3. Once stator core 10 has been secured in stator housing 40, pneumatic cylinder 80 is actuated, causing its piston 81 to urge push block 76 and the attached structure, including stator housing 40, along guide bars 71. In this manner, stator housing 40 can be moved along guide bars 71 until midpoint 13 of stator core 10 coincides with preselected distance "h" for a given length of winding needles 22.

Lead termination equipment locator 110, described below, includes an adjustably locatable abutment plate 112 having bore 113. Abutment plate 112 limits further progress of slide block 61 along guide bars 71 once midpoint 13 of stator core 10 coincides with preselected distance "h." When push block 76 abuts against abutment plate 112 of lead termination equipment locator 110, knob 77 engages bore 113, thereby increasing the rigidity of stator locator 60. The additional rigidity imparted by this scheme improves the precision of the alignment between the respective locators 60 and 110, and further minimizes undesirable vibration of stator locator 60 at higher winding speeds.

During translation of slide block 61 caused by pneumatic cylinder 80, springs 74 disposed in bores 64 are compressed, with the turns of springs 74 guided by guide pins 75. When the winding operation is completed and the coil leads terminated, the pressure in pneumatic cylinder 80 is released. Discharge of cylinder 80 permits springs 74 to expand so that slide block 61 and the associated structure translates away from the winder along guide bars 71. This backward motion is arrested by stop block 101 impacting against shock absorber 100.

Figure 5:
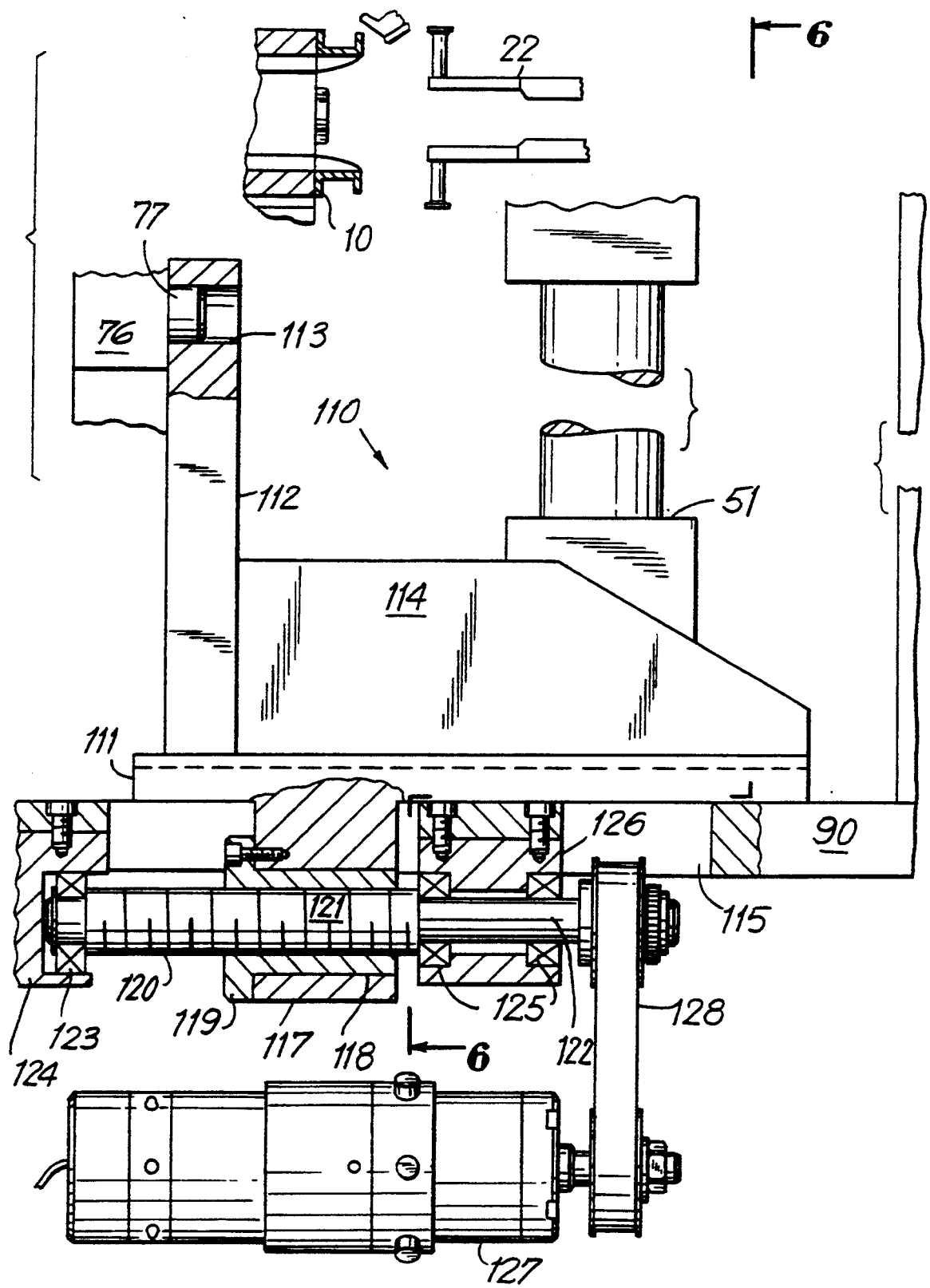
FIG. 5 is a cross-sectional view of a lead termination equipment locator constructed in accordance with the principles of the present invention.
Figure 6:
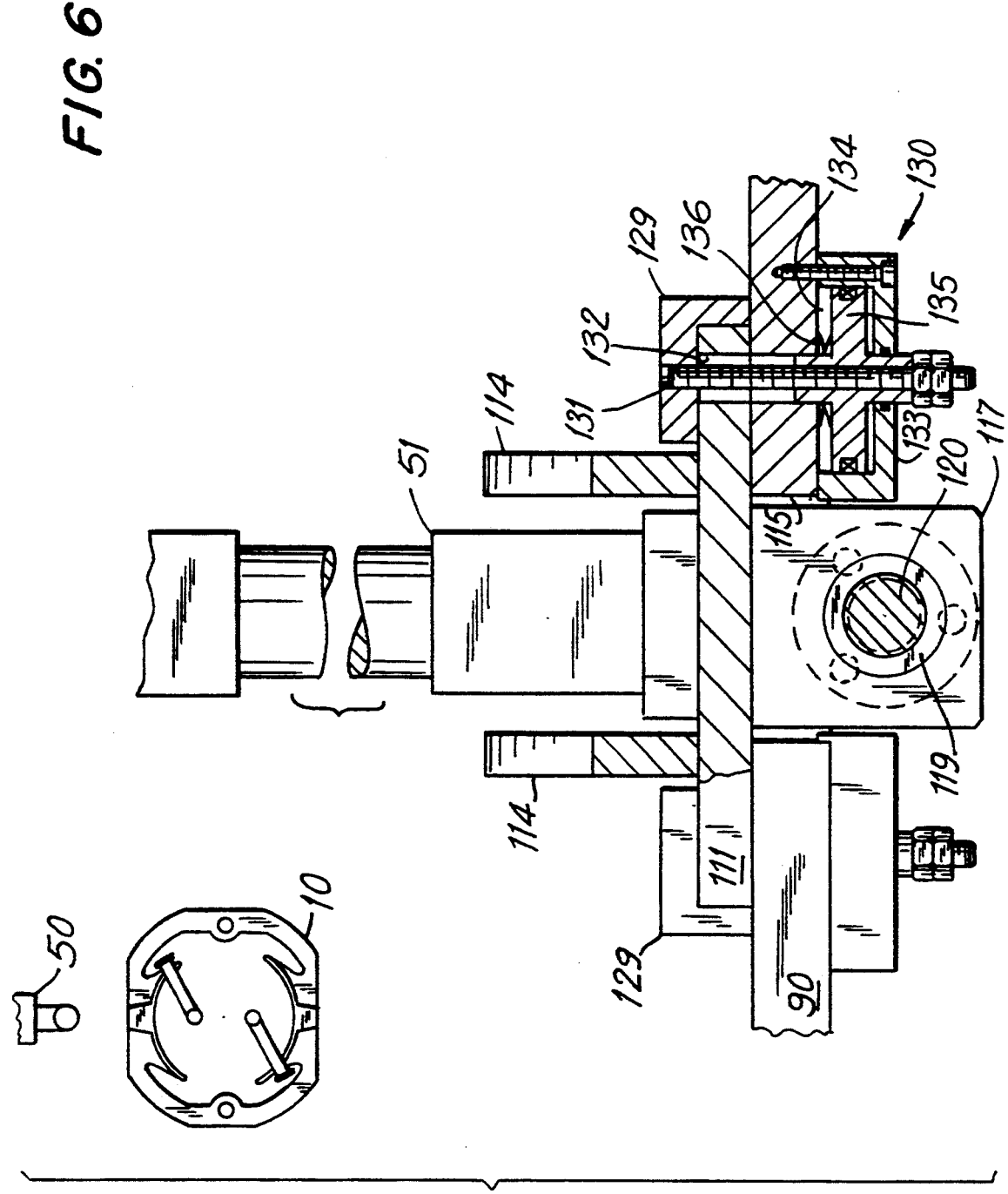
FIG. 6 is a front elevation view of the mechanism of FIG. 5 taken along the line 6—6.

Referring to FIGS. 5 and 6, lead termination equipment locator 110 of the present invention is described. Lead termination equipment locator 110 comprises base plate 111 which carries lead termination equipment support column 51 and stator locator abutment plate 112. Abutment plate 112 has bore 113 in its upper face for engaging knob 77 of stator locator 60, and is buttressed by two support plates 114.

Base plate 111 has block 117 integrally formed from its lower surface. Block 117 passes through slot 115 of winder support plate 90 for engagement with a drive assembly for translating lead termination equipment locator 110. Block 117 has bore 118 carrying threaded sleeve 119, which sleeve is fastened to block 117 by conventional means.

Threaded bar 120 has threaded portion 121 engaged with threaded sleeve 119, and smooth portion 122. One end of threaded bar 120 is supported in bearing 123. Bearing 123 is mounted in bearing block 124, which is in turn affixed to winder support plate 90. The smooth portion 122 of threaded bar 120 is supported in bearings 125. Bearings 125 are mounted in bearing mounting block 126, which is also affixed to winder support plate 90.

Motor 127, attached to winder support plate 90 by conventional means (not shown), rotatingly drives threaded bar 120 via belt transmission 128, thereby causing base plate 111 and its associated structure to translate parallel to the longitudinal axis of winder 30. The controls for motor 127 are connected to those of winder 30 so that lead terminating equipment 50 can be moved to the proper spacing "f" when stator locator 60 is translated for different stator lengths.

Lead terminator locator 110 includes L-shaped guide bars 129 to guide the translation of base plate 111 on winder support plate 90 and to increase the rigidity of support column 51 during winding. For these purposes, L-shaped guide bars 129 overlap the edges of base plate 111, to guide and selectively clamp base plate 111 as it slides along winder support plate 90. Guide bars 129 are connected to pneumatic actuators 130 by bolts 131 which pass through longitudinal slots 132 in base plate 111. This configuration selectively permits either sliding movement of base plate 111 along winder support plate 90, or clamping base plate 111 at a given position.

Actuators 130 are comprised of means 133 forming sealed cavities 134 fastened to the underside of winder support plate 90. Piston 135 is disposed in sealed cavity 134, where the piston is engaged with the threads on the lower portion of bolt 131. Cup springs 136 mounted between pistons 135 and the underside of winder support plate 90 bias pistons 135 away from winder support plate 90. Pneumatic fittings (not shown) are attached to means 133, for introducing pressurized air from a conventional air supply (not shown).

In operation, pressurized air is introduced into sealed cavities 134 through suitable pneumatic fittings, thereby forcing pistons 135 upward against the bias of cup springs 136. As pistons 135 rise in sealed cavities 134, they push bolts 131 and attached guide bars 129 upward, freeing base plate 111. Motor 128 is then actuated to translate base plate 111 via threaded bar 120, so that lead termination equipment 50 can be positioned at the desired spacing "f" for the selected stator locator position. Additional equipment, forming a part of lead termination equipment 50 (not shown), may be employed to impart further translation to the lead termination equipment where a change in the spacing "f" is desired, for example, for a different stator terminal board configuration.

Once lead termination equipment 50 has been translated to the desired location, the pressure in sealed cavities 134 is released, so that cup springs 136 cause guide bars 129 to clamp base plate 111 downward against winder support plate 90. It is contemplated that each guide bar 129 will require at least two actuators 130 to provide even and adequate lifting and compressive forces.

An alternate apparatus for practicing the method of the present invention, wherein a single set of needles 22 could be use for winding stator cores of different lengths, would entail translating winder 30 relative to stator 10 so that the midpoint of the winder longitudinal stroke coincides with stator core midpoint. Winder 30 could be mounted on a slide block similar in design to that of stator locator 60 or lead termination equipment locator 110 described heretofore. However, in view of the substantial weight and vibration of the winder, and the need for high precision positioning, the applicants consider such a solution extremely costly and impractical relative to the preferred embodiment previously described.

What is claimed is:

1. A method of winding coils onto each one of at least first and second stator cores, said first stator core having a longitudinal axis, a first length and an endface, said second stator core having a longitudinal axis, a second length and an endface, said second length being shorter than said first length, said coils being wound using a winder having a longitudinal axis and a stroke which is adjustable between a longer stroke and a shorter stroke, wherein said longer stroke and said shorter stroke have midpoints that coincide with each other, said method comprising the steps of:

a. positioning said first stator core so that its longitudinal axis is parallel with said longitudinal axis of said winder and its endface is located at a reference plane;

b. adjusting the winder to provide said longer stroke;

c. providing relative motion between said first stator core and said winder so that said midpoint of said first stator core coincides with said midpoint of said longer stroke;

d. operating said winder to dispose coils onto said first stator core;

e. repositioning said first stator core away from said winder;

f. positioning said second stator core so that (1) its longitudinal axis is parallel with said longitudinal axis of said winder and (2) its endface is located at said reference plane;

g. adjusting the winding machine to provide said shorter stroke;

h. providing relative motion between said second stator core and said winder so that said midpoint of said second stator core coincides with said midpoint of said shorter stroke; and i. operating said winder to dispose coils onto said second stator core.

2. The method of claim 1 wherein steps (c) and (h) comprise translating said winder relative to said first stator core and said second stator core, respectively.

3. The method of claim 2 further comprising the steps, after step (d), of translating lead termination equipment parallel to said longitudinal axis of said first stator core to achieve a preselected spacing between said lead termination equipment and said endface of said first stator core, and operating said lead termination equipment to terminate said coils disposed onto said first stator core.

4. The method of claim 2 further comprising the steps, after step (i), of translating lead termination equipment parallel to said longitudinal axis of said second stator core to achieve a preselected spacing between said lead termination equipment and said endface of said second stator core, and operating said lead termination equipment to terminate said coils disposed onto said second stator core.

5. The method of claim 2 further comprising the step, after step (i), of repositioning the second stator core away from the winder.

6. Apparatus for automated winding of coils onto a stator core, said stator core having a longitudinal axis, a length, a midpoint, and an endface, said coils being wound using a winder having a stroke length that is selectively adjustable according to said length of said stator core, said stroke length having a midpoint, said apparatus comprising:

a stator housing for positioning said stator core;

first means for providing relative motion between said winder and said stator core, said first means moving parallel to said longitudinal axis of said stator core from a distal position remote from said stator core to a proximal position near said stator core; and second means cooperating with said first means for selecting the location of said proximal position according to said length of said stator core, so that said midpoint of said stroke length coincides with said midpoint of said stator core.

7. The apparatus of claim 6 wherein said first means for providing relative motion comprises means for moving said winder parallel to said longitudinal axis of said stator core.

8. The apparatus of claim 7 further comprising lead termination equipment, said lead termination equipment being translated parallel to said longitudinal axis of said stator core to achieve a preselected spacing between said lead termination equipment and said endface of said stator core.

9. The apparatus of claim 7 wherein said first means comprises:

a support frame;

a pair of guides mounted on said support frame, said guides being parallel with said longitudinal axis of said stator core;

a slide block slidably engaged with said guides; and means for translating said slide block between said distal position and said proximal position.

10. A method of winding coils onto each one of at least first and second stator cores, said first stator core having a longitudinal axis, a first length, a midpoint and an endface, said second stator core having a longitudinal axis, a second length, a midpoint and an endface, said second length being shorter than said first length, said coils being wound using a winder having a longitudinal axis and a stroke length which is selectively adjustable from a longer stroke to a shorter stroke, wherein said longer stroke and said shorter stroke have midpoints that coincide with each other, the method comprising the steps of:

a. positioning said first stator core so that its longitudinal axis coincides with said longitudinal axis of said winder;

b. adjusting said winder to provide said longer stroke;

providing relative motion between said first stator core and said winder to define a first distance at which the midpoint of said first stator core coincides with said midpoint of said longer stroke;

d. operating said winder to dispose coils onto said first stator core;

e. repositioning said first stator core away from said winder;

f. positioning said second stator core so that its longitudinal axis coincides with said longitudinal axis of said winder;

g. adjusting said winder to provide said shorter stroke;
h. providing relative motion between said second stator core and said winder to define a second distance at which the midpoint of said second stator core coincides with said midpoint of said shorter stroke, said second distance being shorter than said first distance; and
i. operating said winder to dispose coils onto said second stator core.

11. The method of claim 10 wherein steps (c) and (h) comprise translating said winder relative to said first stator core and said second stator core, respectively.

12. The method of claim 11 further comprising the steps, after step (d), of translating lead termination equipment parallel to said longitudinal axis of said first stator core to achieve a preselected spacing between said lead termination equipment and said endface of said first stator core, and operating said lead termination equipment to terminate said coils disposed onto said first stator core.

13. The method of claim 12 further comprising the steps, after step (i), of translating lead termination equipment parallel to said longitudinal axis of second stator core to achieve a preselected spacing between said lead termination equipment and said endface of said second stator core, and operating said lead termination equipment to terminate said coils disposed onto said second stator core.

14. The method of claim 13 further comprising the step, after step (i), of repositioning said second stator core away from said winder.

* * * * *